Patented July 10, 1923.

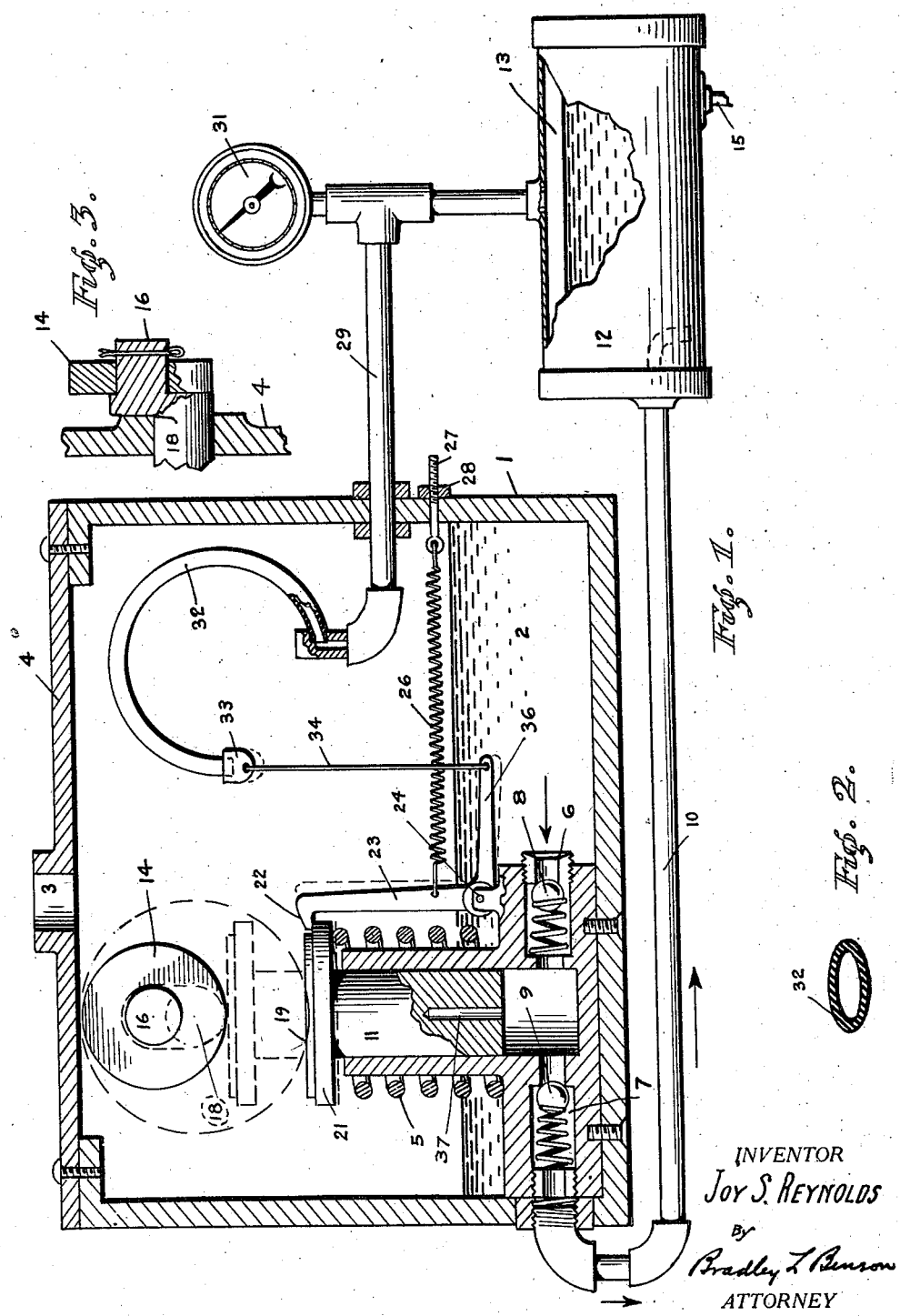

1,461,456

UNITED STATES PATENT OFFICE.

JOY S. REYNOLDS, OF SAN FRANCISCO, CALIFORNIA, ASSIGNOR OF ONE-HALF TO CHARLES A. BALCOM, OF SAN FRANCISCO, CALIFORNIA.

AUTOMATIC CUT-OUT.

Application filed April 26, 1921. Serial No. 464,695.

*To all whom it may concern:*

Be it known that JOY S. REYNOLDS, a citizen of the United States of America, residing at 654 Clement Street, San Francisco, in the county of San Francisco and State of California, has invented certain new and useful Improvements in Automatic Cut-Outs, of which the following is a specification.

The present invention is an automatic cut out and relates particularly to fluid operated devices in which it is desirable to maintain a given pressure by cutting out and cutting in a power driven pump compressor or the like.

The principal object of the invention is to provide an inexpensive apparatus which will positively and accurately throw a compressing element into operative or inoperative relation to a constantly driven source of power, by means of pressure created thereby.

In this specification and the annexed drawings, the invention is illustrated in the form considered to be the best, but it is to be understood that the invention is not limited to such form because it may be embodied in other forms, and it is also to be understood that in and by the claims following the description it is desired to cover the invention in whatever form it may be embodied.

In the accompanying one sheet of drawings, Fig. 1 is a vertical central section of my device.

Fig. 2 is a cross section of a flexible tube circular in plan.

Fig. 3 is a detail side elevation of a shaft driven crank and roller thereon.

Referring to the drawings, the numeral 1 indicates a reservoir adapted to hold a quantity of fluid 2 at any desired depth.

At 3 I show an inlet port in a cover 4 through which fluid may be introduced.

Secured to the floor of the reservoir is a piston pump having an inlet passage 6, discharge passage 7, each controlled by spring pressed valves 8 and 9, adapted, when a piston 11 is reciprocated, to take in fluid 2 and discharge same through passage 7 to a container 12. A quantity of air is trapped as indicated at 13 which is compressed by the rising fluid.

The piston 11 is reciprocated by a roller 14 rotatably mounted on a crank pin 16 secured to a shaft 18 driven by any suitable source of power.

It will be seen that the push of rotation of the roller 14 is eccentric to the shaft 18.

The head 19 of piston 11 is provided with an annular flange 21 adapted to be engaged by a finger 22 on an elbow lever 23 pivoted at the elbow as indicated at 24.

The lever 23 is normally held out of engagement with the flange 21 by a tension spring 26, the tension of which is adjustable by means of a screw 27 freely slidable in the wall of reservoir 1, and a nut 28 thereon.

I provide a pipe 29 communicating with the air trapped in reservoir 12 and interpose on said pipe a gauge 31 for indicating the pressure thereon. The end of the pipe 29 remote from reservoir 12 extends within the reservoir 1 and is provided with a fitting adapted to transmit the pressure in reservoir 12 and pipe 29 to one end of a flexible tube 32 closed at the opposite end by a plug 33.

The tube 32 is arcuate in elevation as shown in Fig. 1 and oblong in cross section as shown in Fig. 2. The purpose of this structure is to utilize the tendency of the tube to straighten out when pressure is applied within the tube to throw the lever 23.

To the plug 33 is secured one end of a link 34, the opposite end of which is secured to an arm 36 on the elbow lever 23.

It will be seen that when pressure in tank 12 reaches a point where the tube 32 straighens, the flexing of said tube will through link 34 actuate elbow lever 23 and cause the finger 22 to engage the flange 21 thus rendering the pump inoperative.

The pressure at which this operation takes place may be governed or determined by the amount of tension applied to spring 26 by nut 28.

In order to facilitate the disengagement of finger 22 from the flange 21 when pressure in reservoir 12 drops below the fixed degree, I so arrange the parts that the roller 14 depresses the piston 11 slightly at each revolution during the time that the pump is inoperative.

As liquid is practically incompressible and in order to prevent the pump from discharging during the slight movement above described, I provide an air cushion by means of a bore 37 in piston 11. I provide a spring 5 to return piston 11 on the upstroke.

What I claim as new and desire to secure by Letters Patent of the United States, is:—

1. An automatic cut-out, comprising, a reservoir adapted to hold fluid, a continuously rotating shaft projecting into said reservoir and having a crank therein, a pump in said reservoir having a piston in position to be actuated by said crank on its inner stroke, a spring positioned to actuate said piston against said crank, a pressure chamber, said pump connected to said chamber, and adapted to take fluid from said reservoir and force it into said chamber, a latch adapted to engage said piston and retain it at approximately the inner limit of its stroke, and means, depending on the pressure in said chamber, for actuating said latch in the direction of engagement with said piston, and a spring tending to actuate said latch in the direction of non-engagement with said piston.

2. An automatic cut-out comprising a continuously rotating shaft, a pump having a piston operated in one direction by said shaft, and in the opposite direction by a spring, a pressure chamber, said pump connected to said chamber and adapted to force fluid thereinto and create a pressure therein, a latch adapted to engage said piston and withhold it from action, pressure means connected to said chamber and adapted to cause said latch to engage said piston, a spring adapted to withdraw said latch from said engagement, and means for adjusting the tension of said spring.

3. An automatic cut-out, comprising, a continuously rotating shaft, a pump having a piston adapted to be operated thereby in one direction, a spring adapted to operate said piston in the reverse direction, a pressure chamber, said pump connected to said pressure chamber and adapted to force fluid thereinto and create a pressure therein, a latch adapted to engage said piston and retain it at approximately the limit of its inner stroke, and pressure operated means connected to said chamber and adapted to operate said latch in the direction of engagement and a spring adapted to operate said latch in the direction of non-engagement.

In testimony whereof I affix my signature.

JOY S. REYNOLDS.